United States Patent
Uljanovs et al.

(10) Patent No.: US 11,868,434 B2
(45) Date of Patent: Jan. 9, 2024

(54) METHOD FOR CREATING TRAINING DATA FOR ARTIFICIAL INTELLIGENCE SYSTEM TO CLASSIFY HYPERSPECTRAL DATA

(71) Applicant: Sharper Shape Oy, Espoo (FI)

(72) Inventors: Jaroslavs Uljanovs, Helsinki (FI); Vladislav Serkov, Helsinki (FI)

(73) Assignee: Sharper Shape Oy, Espoo (FI)

( * ) Notice: Subject to any disclaimer, the term of this patent is extended or adjusted under 35 U.S.C. 154(b) by 473 days.

(21) Appl. No.: 17/213,391

(22) Filed: Mar. 26, 2021

(65) Prior Publication Data
US 2022/0309288 A1  Sep. 29, 2022

(51) Int. Cl.
*G06F 18/214* (2023.01)
*G06N 20/00* (2019.01)
*G06F 17/18* (2006.01)
*G06F 18/21* (2023.01)
*G06F 18/2431* (2023.01)

(52) U.S. Cl.
CPC ............ *G06F 18/214* (2023.01); *G06F 17/18* (2013.01); *G06F 18/217* (2023.01); *G06F 18/2431* (2023.01); *G06N 20/00* (2019.01)

(58) Field of Classification Search
CPC ...... G06F 18/214; G06F 17/18; G06F 18/217; G06F 18/2431; G06N 20/00; G06V 20/194
See application file for complete search history.

(56) References Cited

U.S. PATENT DOCUMENTS

| | | | | |
|---|---|---|---|---|
| 11,200,670 | B2 * | 12/2021 | Maetschke | G06T 11/00 |
| 11,443,417 | B2 * | 9/2022 | Nipe | G06T 7/0004 |
| 2017/0161592 | A1 * | 6/2017 | Su | G06V 10/255 |
| 2018/0365822 | A1 * | 12/2018 | Nipe | G06T 7/11 |
| 2019/0096049 | A1 * | 3/2019 | Kim | G06T 5/50 |
| 2019/0200848 | A1 * | 7/2019 | McDowall | G02B 27/1006 |

(Continued)

FOREIGN PATENT DOCUMENTS

CN  109389080 A  2/2019

OTHER PUBLICATIONS

Neagoe, Victor-Emil et al., CNN Hyperspectral Image Classification Using Training Sample Augmentaion with Generative Adversarial Networks, 2020, IEEE, pp. 515-519 (Year: 2020).*

(Continued)

*Primary Examiner* — Lewis G West
(74) *Attorney, Agent, or Firm* — Ziegler IP Law Group

(57) ABSTRACT

A method for creating training data for an artificial intelligence system to classify hyperspectral data. The method including receiving a hyperspectral image from a data source, wherein the hyperspectral image includes a first pixel group associated with a first classification, forming from the hyperspectral image a first augmented image using a first augmentation algorithm and a second augmented image using a second augmentation algorithm, selecting a first group of sample pixels from the hyperspectral image, the first augmented image and the second augmented image, wherein each pixel of the selected first group of sample pixels is having an association with the first classification or with a second classification and providing the selected first group of sample pixels and the associated classifications of each pixel for an artificial training system to be used as a training data.

18 Claims, 4 Drawing Sheets

(56) References Cited

U.S. PATENT DOCUMENTS

| | | | |
|---|---|---|---|
| 2020/0126232 A1* | 4/2020 | Guo | G06N 7/023 |
| 2023/0048725 A1* | 2/2023 | Barbour | G06T 7/0012 |
| 2023/0162354 A1* | 5/2023 | Roy | G06V 10/26 |
| | | | 382/133 |

OTHER PUBLICATIONS

Hao, Qiaobo et al., Multilable Sample Augmentation-Based Hyperspectral Image Classification, Jun. 2020, IEEE, IEEE Transactions on Geoscience and Remote Sensing, pp. 4263-4278 (Year: 2020).*

Ball et al, "Deep Learning Hyperspectral Image Classification Using Multiple Class-Based Denoising Autoencoders, Mixed Pixel Training Augmentation, and Morphological Operations", 2018 IEEE International Geoscience and Remote sensing Symposium, pp. 6903-6906, XP033438474, DOI: 10.1109/IGARSS.2018.8519368, Jul. 22, 2018, 4 pages.

Notification of Transmittal of The International Search Report and The Written Opinion of The International Searching Authority, or The Declaration, Application No. PCT/FI2022/050072, dated May 19, 2022, 16 pages.

* cited by examiner

METHOD FOR CREATING TRAINING DATA FOR ARTIFICIAL INTELLIGENCE SYSTEM TO CLASSIFY HYPERSPECTRAL DATA

TECHNICAL FIELD

The present disclosure relates to data augmentation and deep learning; and more specifically to a method for creating training data for an artificial intelligence system to classify hyperspectral data.

BACKGROUND

In recent times, technology has played a vital role in developing growing businesses. The increasing reliance on technology has led to continuous improvements in existing technologies, such as via application of machine learning (ML) and artificial intelligence (AI) into existing technologies and processes for further enhancement or improvement. However, to train such machine learning algorithms, the lack of training data is a pervasive problem in ML & hyperspectral data. In one such machine learning application i.e. data augmentation, one of the cornerstones of Machine Learning, is implemented to increase the size of the collected dataset to reduce the problem of lack of training data.

Typically, data augmentation improves machine learning models in a number of ways, such as, but not limited to, improving the generalization of the machine learning models by providing a number of similar, but not identical samples. Such a generalization of the machine learning model discourages the machine learning model from learning the exact features of each training sample, hence improving its performance on unseen or unprocessed samples. Further, data augmentation increases the manifold feature-space of the training data, thus making the machine learning model more likely to accurately classify unseen samples of hyperspectral data. Furthermore, while considering data augmentation in convolutional deep neural networks, a number of augmentation techniques (including RGB channel-wise PCA) are used to improve the final accuracy and generalizability of the results. However, the generation or creation of large and well labelled datasets is a difficult and expensive task requiring an extensive number of hours of repetitive and precise manual labor. Moreover, the generation of the well-labelled or classified datasets becomes increasingly difficult when the labels may only be determined by a domain expert, such as an arborist to identify tree species. As a result, the data augmentation techniques is a crucial technique for artificially increasing the volume of labelled data. However, the machine learning algorithms typically become increasingly resistant to overfitting upon being subjected with more data or inaccurate data, and thus decreasing the accuracy of the machine learning model. Additionally, data augmentation in the field of material or vegetation identification in hyperspectral image (HSI) pixels is not explored and continues to be ever-evolving. Furthermore, even though existing data augmenting techniques are configured to create new augmented data to reduce the shortage of training data, the trained machine learning model upon subsequent operation may provide biased or inaccurate results due to the inherent bias generated while augmenting new data from the existing data.

Therefore, in light of the foregoing discussion, there exists a need to overcome the aforementioned drawbacks associated with existing data augmentation and deep learning techniques and provide an improved method for creating training data for an artificial intelligence system to classify hyperspectral data.

SUMMARY

The present disclosure seeks to provide a method for creating training data for an artificial intelligence system to classify hyperspectral data. The present disclosure also seeks to provide a system for creating training data for an artificial intelligence system to classify hyperspectral data. The present disclosure further seeks to provide a method for training an artificial intelligence model for classifying hyperspectral data. The present disclosure also seeks to provide an artificial intelligence system trained based according the method for training artificial intelligence system. An aim of the present disclosure is to provide a solution that overcomes at least partially the problems encountered in prior art.

In one aspect, an embodiment of the present disclosure provides a method for creating training data for an artificial intelligence system to classify hyperspectral data, the method comprising:
  receiving a hyperspectral image from a data source, wherein the hyperspectral image comprises a first pixel group, wherein each pixel of the first pixel group being associated with a first classification;
  forming from the hyperspectral image a first augmented image using a first augmentation algorithm, wherein the first augmented image comprises a first augmented pixel group, the first augmented pixel group being augmented from the first pixel group, each pixel of the first augmented pixel group being associated with the first classification;
  forming from the hyperspectral image a second augmented image using a second augmentation algorithm which is different from the first augmentation algorithm, wherein the second augmented image comprises a second augmented pixel group, the second augmented pixel group being augmented from the first pixel group, each pixel of the second augmented group being associated with the first classification;
  selecting a first group of sample pixels from the hyperspectral image, the first augmented image and the second augmented image, wherein each pixel of the selected first group of sample pixels is having an association with the first classification or with a second classification; and
  providing the selected first group of sample pixels and the associated classifications of each pixel for an artificial training system to be used as a training data.

In another aspect, an embodiment of the present disclosure provides a system for creating training data for an artificial intelligence system to classify hyperspectral data, the system comprising
  a communication interface to receive a hyperspectral image
  a data base for storing the hyperspectral image and one or more augmented images and created training data;
  a processing arrangement configured to execute the steps of the method for creating training data for an artificial intelligence system to classify hyperspectral data.

In another aspect, an embodiment of the present disclosure provides a method for training an artificial intelligence system wherein the training data is created according to the method for creating training data for an artificial intelligence system to classify hyperspectral data.

In yet another aspect, an embodiment of the present disclosure provides an artificial intelligence system wherein the artificial intelligence system is trained according to the method for training an artificial intelligence system.

Embodiments of the present disclosure substantially eliminate or at least partially address the aforementioned problems in the prior art and provide an improved method for creating training data for an artificial intelligence system to classify hyperspectral data.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
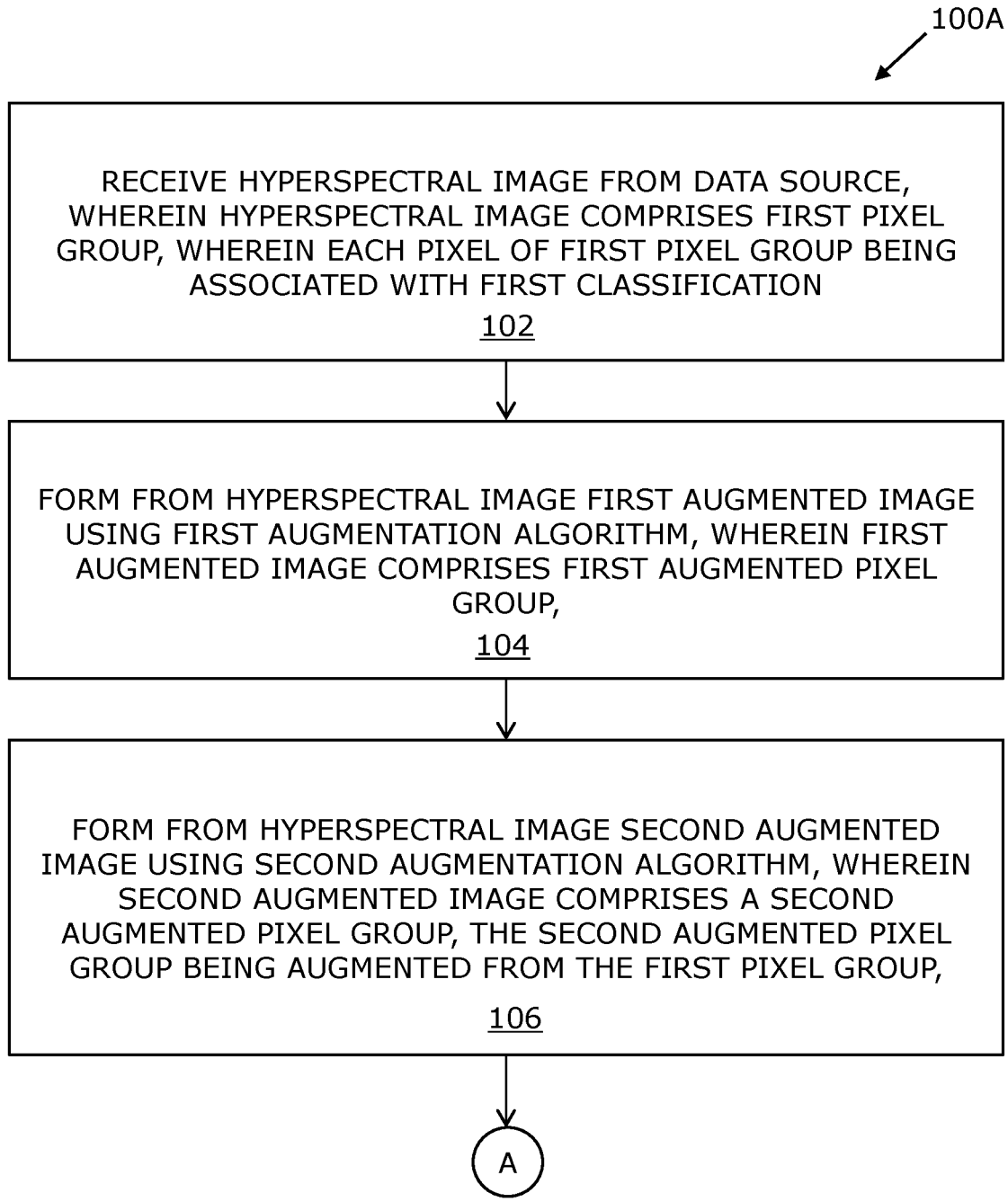
FIGS. 1A and 1B illustrate a flowchart listing steps involved in a method for creating training data for an artificial intelligence system to classify hyperspectral data, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for creating training data for an artificial intelligence system to classify hyperspectral data, the method comprising:
receiving a hyperspectral image from a data source, wherein the hyperspectral image comprises a first pixel group, wherein each pixel of the first pixel group being associated with a first classification;
forming from the hyperspectral image a first augmented image using a first augmentation algorithm, wherein the first augmented image comprises a first augmented pixel group, the first augmented pixel group being augmented from the first pixel group, each pixel of the first augmented pixel group being associated with the first classification;
forming from the hyperspectral image a second augmented image using a second augmentation algorithm which is different from the first augmentation algorithm, wherein the second augmented image comprises a second augmented pixel group, the second augmented pixel group being augmented from the first pixel group, each pixel of the second augmented group being associated with the first classification;
selecting a first group of sample pixels from the hyperspectral image, the first augmented image and the second augmented image, wherein each pixel of the selected first group of sample pixels is having an association with the first classification or with a second classification; and
providing the selected first group of sample pixels and the associated classifications of each pixel for an artificial training system to be used as a training data.

In another aspect, the present disclosure provides a system for creating training data for an artificial intelligence system to classify hyperspectral data, the system comprising
a communication interface to receive a hyperspectral image;
a data base for storing the hyperspectral image and one or more augmented images and created training data;
a processing arrangement configured to execute method steps for the method for creating training data for an artificial intelligence system to classify hyperspectral data.

In yet another aspect, the present disclosure provides a method training an artificial intelligence system, wherein the training data is created according to the method for creating training data for an artificial intelligence system to classify hyperspectral data.

In yet another aspect, the present disclosure provides an artificial intelligence system, wherein the artificial intelligence system is trained according to the method for training the artificial intelligence system.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The present disclosure provides a method for creating training data for an artificial intelligence system to classify hyperspectral data. The term "hyperspectral data" refers to a spatially sampled dataset comprising a plurality of pixels related to hyperspectral images captured or collected by hyperspectral imaging devices across the electromagnetic spectrum. Typically, each pixel in the hyperspectral data or image corresponds to a spectral band in the electromagnetic spectrum. The term "spectral band" refers to a matrix of points defined by three dimensions, its coordinates and the intensity relating to the multiple spectral bands of the hyperspectral image. Generally, the hyperspectral band comprises of narrow spectral bands of the order of 10-20 nanometer (nm) and number of spectral bands range in from hundreds to millions of spectral bands. The term "hyperspectral imaging or HSI" refers to a type of spectral imaging for inferring spectral characteristics of an image, wherein the spectra is divided to N different wavelengths. Notably, the sampling of the hyperspectral data may or may not be spatially regular based on the implementation. However, the irregular spatial sampling of the HSI data used herein may be orthorectified, i.e. normalized in a given plane, such as the x-y plane. Generally, each pixel in the hyperspectral image covers or represents a 20 cm×20 cm area. However, the resolution may be configured to be changed based on the implementation. For example, each pixel may cover a 5 cm×5 cm area, 10 cm×10 cm area, 50 cm×50 cm area, 1 m×1 m area and so forth. Generally, the hyperspectral images are employed to obtain the spectrum for each pixel in the hyperspectral image. For example, the hyperspectral image of a scenario to find, distinguish and identify objects and materials and/or detecting processes. The method comprises creating training data, wherein the training data refers to processed hyperspectral data further used to classify the captured hyperspectral data. The processed hyperspectral data may be generated via augmenting a prelabelled hyperspectral dataset, wherein the pre-labelled dataset comprises of HSI sample pixels, each pre-classified (for example, by a human or computing system) to belong into a class (class being a material, a vegetation type, a tree species etc.). Typically, the augmenting or augmentation refers to generating (or calculating) a new pixel from an original pixel, wherein the new generated pixel having similar but not same spectral characteristics as of the original pixel, and labeling it to the same class as the original pixel. The augmentation is performed for each pixel in the hyperspectral image to form the hyperspectral training data. Beneficially, such augmentation and classification of data, reduces the existing problem of overfitting and lack of overfitting training data for classifying hyperspectral data via machine learning (ML) or artificial intelligence (AI) system. Generally, the AI system comprises of a combination of software, hardware and firmware components configured to perform at least one task, such as, but not limited to, classifying hyperspectral data, augmenting hyperspectral data and so forth. Additionally, the hyperspectral training data provides a comprehensive set of possible data points, thus minimizing the distance between the training data and any validation data upon classification, as well as for future testing of classified data.

The method enables reducing or eliminating the evasive problem of lack of training data by generating new training data by augmenting the existing hyperspectral data. Typically, the novel method of generating the training data in a probabilistic manner increases the amount of available training data. Such an increase in the amount of available training data increases the accuracy and efficiency of the method and enables the artificial intelligence system to accurately classify the hyperspectral data and consequently enhance the performance of the method. Moreover, the method reduces or eliminates the existing problem of over-fitting of data caused when any machine learning or AI model learns the details and any or all noise in the training data to such an extent, that the performance of the ML or AI model i.e. the classification of new hyperspectral data is negatively impacted.

The method comprises receiving a hyperspectral image from a data source. The "data source" refers to any source of data providing the hyperspectral image. Typically, hyperspectral images are obtained by imaging via hyperspectral imaging devices (such as, airborne or satellite sensors or drones) on a target area, comprising information of objects in multiple consecutive and segmented spectral bands ranging from visible to the infrared spectral region. Additionally, the hyperspectral image may be received directly from or from a local or remote system and/or database comprising the hyperspectral data. In an example, the data source is a drone or unmanned aerial vehicle (UAV) configured with a hyperspectral imaging device to capture and transmit the hyperspectral data. In another example, the data source is a proprietary database comprising hyperspectral images or data. Typically, each hyperspectral image comprises of a plurality of pixels (for example, 512 pixels), wherein the plurality of pixels may be further classified into one or more pixel groups (for example, two pixel groups of 256 pixels each). The term "pixel group" refers to a defined number of pixels grouped together, either randomly or based on a spectral characteristic or feature (for example, colour or wavelength). Herein, in the method, the hyperspectral image comprises a first pixel group, wherein each pixel of the first pixel group being associated with a first classification. The term "classification" refers to the predictive labelling of input hyperspectral pixel data based on at least one spectral characteristic, wherein the predictive labelling or classification is done via either a human operator or the AI system. In an example, a human-expert such as an arborist, classifies the hyperspectral image comprising two different trees and correspondingly different spectral characteristics, into two different pixel groups based on two different classifications by the arborist. In another example, arborists are tasked with georeferencing samples of particular tree species within the collected hyperspectral data to create the training data. Generally, the classification is based on vegetation type, material type, size or shape of object etc. and configured to be modified as per the implementation without limiting the scope of the disclosure. Typically, each pixel in the first pixel group is associated with the first classification. For example, in a hyperspectral image of two vegetation types, namely mahogany and maple trees are characterized wherein the pixel group of mahogany trees is associated with a first classification, whereas the pixel group of maple trees is associated with a second classification.

In an embodiment, the first pixel group of the hyperspectral image is a representation of a first object, the first object having association with the first classification. Generally, the hyperspectral image comprises of a plurality of objects that may or may not have the same classification. In other words, the plurality of objects may or may not be different from one another based on type, size, color etc. The term "first object" refers to any object or material on the first hyperspectral image associated with the first classification. For example, the first classification of mahogany trees, comprises a first object as the first mahogany tree or the first group of mahogany trees.

In another embodiment, the hyperspectral image comprises a second pixel group which is a representation of a second object, the second object having association with the second classification. Specifically, objects of different types are classified by using different classifications (such as the first or second classification). For example, the hyperspectral image comprises two groups of trees, namely a first group of mahogany trees and a second group of maple trees. Herein, the method comprises labelling the first group of mahogany trees with a first classification of "mahogany" and grouping them as the first object and labelling the second group of maple trees with a second classification of "maple" and grouping them as the second object. Optionally, both the first and second objects, i.e. the first group of mahogany trees and the second group of maple trees in the aforementioned example, are labelled together via a third super-classification of "tree".

The method comprises forming from the hyperspectral image a first augmented image using a first augmentation algorithm. The "augmented image" refers to the processed hyperspectral image based on an augmentation algorithm. The data processing or data augmentation refers to a method to increase the diversity of available hyperspectral training data, without actually collecting new data. Generally, the data augmentation techniques include, but is not limited to, position augmentation techniques such as resizing, cropping, padding and horizontal flipping, colour augmentation techniques including changing pixel values or spectral signatures, such as contrast, brightness, saturation, hue, colour normalization etc. and combination of both position and colour augmentation techniques are used to train large deep neural networks. Typically, the method comprises augmenting the hyperspectral image to form the first augmentation image via the first augmentation algorithm. The term "augmentation algorithm" refers to an algorithm employed by the method to augment or modify the hyperspectral image to generate a new augmented image to increase the amount of available training data. Typically, the data augmentation algorithm modifies or alters the spectral characteristics of the hyperspectral image to form a modified hyperspectral image without capturing or collecting a new hyperspectral image. Beneficially, such an augmentation process reduces the problem of lack of training data by generating hyperspectral training data from existing hyperspectral datasets (such as, the hyperspectral image). The first augmented image comprises a first augmented pixel group, wherein the first augmented pixel group being augmented from the first pixel group, each pixel of the first augmented pixel group being associated with the first classification. The augmentation algorithm is implemented at a pixel level, i.e. the plurality of pixels in the hyperspectral image are augmented using the first augmentation algorithm. Specifically, each of the plurality of pixels forming the first pixel group are augmented using the first augmentation algorithm to form the first augmented pixel group. Typically, such augmentation may be performed for each pixel and/or pixel groups until a required amount of training data is generated for the AI system.

In an embodiment, the first augmentation algorithm comprises selecting a pixel to be augmented from the hyperspectral image. Specifically, upon selecting the first augmentation algorithm, a pixel from the first pixel group is selected to be augmented using the first augmentation algorithm. Notably, the selection of the pixel is done in a random manner to increase to reduce any bias that may occur in the training data. Additionally, optionally, upon selecting the pixel to be augmented, the pixel data is standardized to make the variables internally consistent with each other regardless of their type. For example, if a pixel having dimensions m×n is dependent upon two variables i.e. temperature (measured in degree Celsius) and rainfall (measured in cm), the variables range and units being different in order of magnitude may introduce a model bias towards some variables. Thus, standardization of the pixel data to a common scale is done by multiplication with a standardization factor or other standardization means. Further, the first augmentation algorithm comprises decomposing spectral bands to identify eigenvectors and eigenvalues, wherein the spectral bands correspond to a spectral signature of the pixel. The term "spectral signature" refers to the variation of reflectance or emittance of an object or material with respect to the wavelength (i.e., reflectance/emittance as a function of wavelength). Generally, the eigenvectors (i.e. the principal components) determine the directions of the new feature space, and the eigenvalues determine their magnitude. In other words, the eigenvalues indicate the variance of the hyperspectral data along the new feature axes based on the eigenvectors. Specifically, to identify the eigenvectors and eigenvalues, one or more methods such as, but not limited to, computing a co-variance matrix of the pixel, a co-relation matrix of the pixel, or via single value decomposition (SVD). Herein, to identify the eigenvectors and eigenvalues, the plurality of spectral bands are decomposed using SVD to obtain the spectral signature of the pixel. In an exemplary scenario, the singular value decomposition of the selected pixel having m×n dimensions is a complex matrix M, which is a factorization of the form UΣV, where U is an complex unitary matrix of m×m dimensions, Σ is a rectangular diagonal matrix of m×n dimensions (with non-negative real numbers on the diagonal entities), and V is a complex unitary matrix of n×n dimensions. Herein, the diagonal entities or entries of the Σ matrix are known as the eigenvalues, whereas the columns of the complex matrix U and V are the eigenvectors. Upon identifying the eigenvalues and eigenvectors, the first augmentation algorithm comprises selecting a largest eigenvalue for the pixel and augmenting the pixel by multiplying the selected largest eigenvalue by a random scaling factor. Specifically, the first augmentation algorithm is applied across each instance, wherein each spectral band of the selected pixels are decomposed into eigenvectors and eigenvalues. Notably, the selected largest eigenvectors signify the principal components of the instance i.e. the characteristic or defining component or feature for the given instance. Thus, the selected largest eigenvalue is perturbed or multiplied by the random scaling factor (α), wherein the multiplication may be done within a range of $α_{min}$ to $α_{max}$ or +/−α. Upon multiplication of the selected largest eigenvalues, the modified eigenvalues or principal components are re-assembled and converted back into the spectral domain in order to generate the novel augmented pixel. Further, the first augmentation algorithm comprises selecting a next pixel to be augmented from the hyperspectral image, wherein the next pixel is different from a previously augmented pixel and repeating steps the aforementioned steps until all pixels of the hyperspectral image are augmented. Beneficially, the created training data eliminates the problem of lack of available training data by employing the limited amount of existing hyperspectral data to create the training data and thus making the training of the artificial intelligence system faster and also eliminates the potential costs associated with collecting new hyperspectral data for training.

The method comprises forming from the hyperspectral image a second augmented image using a second augmentation algorithm which is different from the first augmentation algorithm, wherein the second augmented image comprises a second augmented pixel group, the second augmented pixel group being augmented from the first pixel group, each pixel of the second augmented group being associated with the first classification. The second augmented image is generated using the second augmentation algorithm. Specifically, the hyperspectral image comprising the first pixel group associated with the first classification is selected by the method and augmented using the second augmentation algorithm to generate the second augmented pixel group. Beneficially, by performing the second augmentation algorithm which is different from the first augmentation algorithm, a new novel hyperspectral augmented image is generated from the same hyperspectral image i.e. the first augmented pixel group being different from the second augmented pixel group. Herein, the first augmentation algorithm and the second augmentation algorithm are performed either simultaneously or succeeding one another. Alternatively stated, the second augmented algorithm may be performed on either the un-augmented first pixel group or the augmented first pixel group (using the first augmentation algorithm) to generate the second augmented pixel group.

In an embodiment, the second augmentation algorithm comprises selecting a pixel to be augmented from the hyperspectral image. The selection of the pixel from the hyperspectral image may be done in a random manner or in a specified order (such as, similar to the selection of the first augmentation algorithm). Upon selecting the pixel to be augmented, the second augmentation algorithm comprises decomposing spectral bands to determine a covariance matrix, wherein the spectral bands correspond to a spectral signature of the pixel. The decomposed spectral bands corresponding to spectral signature of the pixel enable the second augmentation algorithm to compute the co-variance matrix. Upon computing the covariance matrix, the second augmentation algorithm comprises computing a multivariate normal distribution, around a mean value of each spectral band, using the covariance matrix. The "mean value" refers to the average of the spectral bandwidth of spectral bands. For example, a spectral band from 200-300 nm has a mean value of 250 nm. Upon computing the multivariate normal distribution, the second augmentation algorithm comprises scaling the multivariate normal distribution by multiplying with an optimisable magnitude parameter. The "optimisable magnitude parameter" refers to a parameter configured to optimize and/or scale the computed multivariate normal distributions, since the variable in the multivariate normal distribution may have different units and/or measurements. Herein, the variables in the multivariate normal distribution are multiplied by the optimisable magnitude parameter to generate a scaled multivariate normal distribution. Further, the second augmentation algorithm comprises adding the scaled multivariate normal distribution to the pixel for augmenting the pixel. Upon scaling the computed multivariate normal distribution, the scaled multivariate normal distribution is added or implemented to the selected pixel to generate the novel augmented second pixel. Further, the second augmentation algorithm comprises selecting a next pixel to be augmented from the hyperspectral image, wherein the next pixel is different from previously augmented pixel and repeating the aforementioned steps until all pixels of the hyperspectral image are augmented. Beneficially, the application of the second augmentation algorithm produces another unique training data with respect to the first augmentation algorithm (or the first augmented image) to provide additional training data from the existing hyperspectral data and thus reducing the overfitting and lack of training data problem effectively without actually capturing new or additional hyperspectral data and thus no additional costs.

In an embodiment, the method further comprises forming from the hyperspectral image a third augmented image using a third augmentation algorithm which is different from the first and the second augmentation algorithm, wherein the third augmented image comprises a third augmented pixel group, the third augmented pixel group being augmented from the first pixel group, each pixel of the third augmented group being associated with the first classification and selecting further comprises selecting to the first group of sample pixels, pixels from the third augmented image. Herein, the third augmentation algorithm that is different from the first and second augmentation algorithm is performed on the hyperspectral image to generate the third augmented image. Specifically, the third augmented image is generated by implementing the third augmentation algorithm on the first pixel group associated with the first classification and selecting the pixel further comprises adding or selecting the pixels from the third augmented image to the first pixel group or the first group of sample pixels. Beneficially, the third augmentation algorithm provides yet another novel augmented image different from the first and second novel augmented images from the same hyperspectral image, thus reducing the overfitting and lack of training data problem effectively without actually capturing new or additional hyperspectral data and thus no additional costs.

In another embodiment, the third augmentation algorithm comprises selecting a pixel to be augmented from the hyperspectral image. Typically, the selection of the pixel may be done in a random manner or in a specific order such as similar to the selection of the first or second augmentation algorithm. Notably, the selected pixel is either an un-augmented pixel or an augmented pixel (using the first or second augmentation algorithm or both). Upon selecting the pixel to be augmented, the third augmentation algorithm comprises identifying one or more pixels using a Poisson distribution, wherein the one or more pixels are adjacent to the pixel. Typically, the neighboring or adjacent pixels are identified via the Poisson distribution. The "Poisson distribution" refers to a discrete probability distribution of a number of events occurring in a given time period, given the average number of times the event occurs over that time period. In an example, the Poisson distribution is used to determine the adjacent pixels by using the position or spectral characteristics of the selected pixel. Upon identifying the one or more pixels, the third augmentation algorithm comprises adding the identified one or more pixels, with the selected pixel, to form a super-pixel for augmenting the pixel. Typically, identified one or more pixels are added or implemented with the selected pixel to generate the super-pixel, wherein the super-pixel represents the novel augmented third pixel. Further, upon generating the super-pixel, the third augmentation algorithm comprises selecting a next pixel to be augmented from the hyperspectral image, wherein the next pixel is different from previously augmented pixel and repeating the aforementioned steps until all pixels of the hyperspectral image are augmented.

In an embodiment, the first augmentation algorithm is principle component analysis, the second augmentation algorithm is multi variate noise method. Generally, data augmentation comprises increasing the size of a dataset by transforming it in ways that a neural network is unlikely to learn by itself. For example, image-recognition datasets often train with images flipped vertically or horizontally. Another form of data augmentation on image datasets is to alter the color balance of the image—for example, adjusting the values of the red, green, and blue pixels in the image. Specifically, the first augmentation algorithm or principle component analysis (PCA) is designed to alter or update principal component values and/or eigenvalues of the selected pixel to form a novel augmented pixel from the hyperspectral image (or pixel). Typically, PCA is applied across every training instance, wherein the spectral bands are decomposed into eigenvectors and eigenvalues. The largest eigenvectors signifying the principal components and the largest eigenvalues of each instance are perturbed by a random value or factor, re-assembled and converted back into the spectral domain to form the novel augmented pixel. Beneficially, the PCA improves the performance of the method at a very low cost of machine learning model accuracy. Other benefits of PCA include reduction of noise in the hyperspectral data, feature selection (to a certain extent) and the ability to produce and/or infer independent and uncorrelated features of the data. Further, the second augmentation algorithm is multi variate noise method, wherein the PCA analysis of each training instance is performed to enable the method to determine the covariance matrix of the spectral bands for each instance. Once the covariance matrix is computed, the covariance matrix is employed to compute the multivariate normal distribution, around the mean value of each spectral band. The selected random perturbation is then multiplied by the optimisable magnitude parameter to generate the scaled multivariate perturbation and then the scaled multivariate normal distribution is added to the sampled pixel within the instance to form the novel augmented pixel. Notably, the first or the second augmentation algorithm is performed in a probabilistic manner i.e. the first augmentation algorithm and the second augmentation algorithm have an equal chance of occurrence, each time a training pixel is sampled and trained upon. Hence each training sample has an equal probability of being augmented without losing its principal features which define it to fall within the given instance.

In another embodiment, the third augmentation algorithm is stochastic random averaging method. The stochastic random averaging method comprises determine a number of pixels (N) from a training instance to be sampled to generate a novel augmented pixel. The value N is determined via random sampling from a Poisson distribution. Beneficially, the poisson distribution is implemented since it can be parameterized such that both cases of, small number of available pixels and large number of available pixels for augmenting or averaging may be accommodated by the method together. This results in an efficient and generalized model, since the method takes into consideration multiple combinations of super-pixel sizes as samples from an object training instance. Notably, the third augmentation algorithm also has an equal probability of occurrence as that of the first and second augmentation algorithms. Such a type of augmentation may also be considered as, weakly, accounting for the lack of spatial component in the neural network architecture, without the expense and difficulty of curating a spatially coherent training dataset.

The method comprises selecting a first group of sample pixels from the hyperspectral image, the first augmented image and the second augmented image. Upon forming the first and second augmented images from the hyperspectral image using the first and second augmentations, respectively, the first group of sample pixels is selected from the hyperspectral image, the first augmented image and the second augmented image. Specifically, the first group of sample pixels are selected in a random manner from the hyperspectral image, the first augmented image and the second augmented image; wherein each pixel of the selected first group of sample pixels is having an association with the first classification or with a second classification. The term "second classification" refers to another type of classification, different from the first classification based on which the selection of the first group of sample pixels is carried out by the method. Typically, the selected first group of sample pixels from the hyperspectral image, the first augmented image and the second augmented image are associated to either the first classification or the second classification. Notably, the second classification may be a super-classification including the first classification or simply a different classification from the first classification. In an example, the first group of sample pixels are associated with a first classification of mahogany trees or a second classification (super-classification) of trees which also includes the first classification of mahogany trees. In another example, the first group of sample pixels are associated with a first classification of trees or a second classification of shrubs, which is different from the first classification.

In an embodiment, the method further comprises selecting the first group of sample pixels from the hyperspectral image, the first augmented image, the second augmented image and the third augmented image.

In another embodiment, selecting the first group of sample pixels comprises defining a sample size. The term "sample size" refers to the number of pixels to be selected by the method, wherein the sample size may be defined by a human operator or configured based on the implementation. Further, upon defining the sample size, selecting randomly amount of pixels corresponding to the sample size from the hyperspectral image, the first augmented image, the second augmented image and the third augmented image to form the first group of pixels. Typically, corresponding to the defined sample size, the amount of pixels are randomly selected from the hyperspectral image, the first, second and third augmented images. The random selection of the amount of pixels and/or the pixels the augmented from the hyperspectral image, the first augmented image, the second augmented image and the third augmented image enables the method to effectively train the AI system without developing an inherent bias during augmentation and improves the accuracy of classification of hyperspectral data using the AI system.

In yet another embodiment, the random selection is carried by setting a first selection probability for the hyperspectral image, a second selection probability for the first augmented image, a third selection probability for the second augmented image and a fourth selection probability for the third augmented image selection probabilities for each image type. Generally, the selection probabilities of each image types are set in an equal and probabilistic manner, by designation of the first selection probability for the hyperspectral image, the second selection probability for the first augmented image, the third selection probability for the second augmented image and the fourth selection probability for the third augmented image as 25%. Thus, the probability of selection of any one of the hyperspectral image (or the un-augmented image), or the first, second or third augmented images is equal and un-biased to provide an un-biased and accurate training data. Further, the random selection comprises selecting randomly a sample image using the selection probabilities. The "sample image" refers to the any one of the selected images from the hyperspectral image or the first, second or third augmented image. Furthermore, upon selecting the sample image using the selection probabilities, selecting randomly a pixel from the randomly selected image sample image. In other words, the sample pixel is randomly selected from the sample image for further operation. Furthermore, the random selection comprises repeating the aforementioned steps until amount of selected pixels corresponds to the sample size. Beneficially, such a novel approach of using a combination of statistical and data averaging augmentation techniques and/or the combination of statistical and spatial augmentation techniques herein enables the method to generate unique hyperspectral training data in both, the probabilistic class domain and the real-data training instance domain. Further, since the augmentation algorithms are applied at random using the selection probabilities at every training sample selection, each iteration through the entire set of training data is unique. Thus, the method allows for better generalization and improved accuracy of the final trained deep learning classifier via the artificial intelligence and/or training system.

The method comprises providing the selected first group of sample pixels and the associated classifications of each pixel for an artificial training system to be used as a training data. Upon selecting the first group of sample pixels from the first, second and third augmented images in a random manner, the method comprises providing the selected first group of sample pixels and the associated classifications (i.e. the first or second classification) of each pixel in the selected group of sample pixels to the artificial training system. The "artificial training system" refers to an AI or ML model including a training algorithm (i.e., the learning algorithm) to employ the selected first group of sample pixels as the training data to learn from. Notably, the training data should be accurate and without errors or any bias, known as target or target attribute. Typically, the artificial training system comprises of a combination of software, firmware and optionally hardware components to perform the method for training based on the provided training data. Herein, the artificial training system identifies patterns in the training data that map the input data attributes to the target attributes (i.e. to be determined by the artificial training system) using the training algorithm. In an example, the training algorithm employed is stochastic gradient descent (SGD).

In an embodiment, each pixel to be used for the training data has an associated classification. Typically, each pixel selected from the sample image (i.e. any one of the hyperspectral, the first, second or third augmented image) to be used as training data by the artificial training system comprises the associated classification. In other words, each pixel is associated with at least one classification, such as the first classification for the first group of pixels, before being implemented as training data by the artificial training system.

The present disclosure also provides a system for creating training data for an artificial intelligence system to classify hyperspectral data, in accordance with an embodiment of the present disclosure. The "system" for creating training data for an artificial intelligence system to classify hyperspectral data refers to hardware, software, firmware or a combination of these configured to perform a plurality of computing tasks based upon an input (hyperspectral data) from a data source. Examples of the computing system may include, but are not limited to, a computer, a virtual machine (VM). Generally, the computing system or the computing device includes computational elements such as a memory, a processor, a data communication interface, a network adapter and the like, to store, process and/or share files or information with other computing devices, such as another computation device, or server and the like. The system comprises a communication interface to receive a hyperspectral image from the data source. The "communication interface" refers to a communication medium or channel configured to connect or communicatively couple various system components. The communication interface may be any one of a user interface, a communication network or a communication module. Examples of communication interfaces include, but is not limited to, graphical user interfaces (GUIs), application programming interfaces (APIs) and so forth, or communication networks such as Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks, and Worldwide Interoperability for Microwave Access (WiMAx) networks.

The system comprises a data base for storing the hyperspectral image and one or more augmented images and created training data; Herein, the term "database" refers to an organized body of digital information, regardless of the manner in which the hyperspectral data or the organized body thereof is represented. Optionally, the database may be hardware, software, firmware and/or any combination thereof. For example, the organized body of related hyperspectral data may be in the form of a table, a map, a grid, a packet, a datagram, a file, a document, a list or in any other form. The database includes any data storage software and systems, such as, for example, a relational database like IBM DB2 and Oracle 9. The said database is operable to store the hyperspectral data received from the data sources. Beneficially, the data collected in the database arrangement is used by the system employing the one or more machine learning training algorithms to train the artificial training system based on the provided training data and classify hyperspectral data.

The system comprises a processing arrangement configured to execute the steps of the method for creating training data for an artificial intelligence system to classify hyperspectral data. The "processing arrangement" refers to a structure and/or module that includes programmable and/or non-programmable components configured to store, process and/or share information or data for creating training data to classify hyperspectral data. Optionally, the processing arrangement includes any arrangement of physical or virtual computational entities capable of enhancing information to perform various computational tasks. Furthermore, it will be appreciated that the processing arrangement may be implemented as a hardware processor and/or plurality of hardware processors operating in a parallel or in a distributed architecture. Optionally, the processors in the processing arrangement are supplemented with additional computation system, such as neural networks, and hierarchical clusters of pseudo-analog variable state machines implementing artificial intelligence algorithms. In an example, the processing arrangement may include components such as a memory, a processor, a data communication interface, a network adapter and the like, to store, process and/or share information with other computing devices, such as the data source. Optionally, the processing arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit, for example as aforementioned. Additionally, the processing arrangement is arranged in various architectures for responding to and processing the instructions for creating training data for an artificial intelligence system to classify hyperspectral data via the system.

In an embodiment, the processing arrangement comprises means to perform random selection of pixels, the means selected from a group of a random generator, a pseudorandom generator, a pre-defined sequence, a seed based random generator. Specifically, the random selection of pixels, such as the first group of pixels or the first group of sample pixels is done by employing at least one of the means selected from the group of a random generator, a pseudorandom generator, a pre-defined sequence, a seed based random generator. It will be appreciated by a person skilled in the art that the means for random selection may be changed without limiting the scope of the disclosure.

In an embodiment, wherein a selection probabilities for a hyperspectral image, a first augmented image, a second augmented image and a third augmented image are modified based on feedback loop from training process of artificial intelligence system. The "feedback loop" refers to a type of loop as a part of the system, wherein the feedback loop utilizes the system's output (novel augmented sample pixel) as input training data for the artificial training system. Typically, based on the need of the implementation, the selection probabilities for the hyperspectral image, the first augmented image, the second augmented image and the third augmented image are modified to increase or decrease the selection of any one of augmented (i.e. the first, second and third augmented images) or un-augmented (i.e. the hyperspectral image) images. Beneficially, the feedback loop is a corrective feedback loop configured based on either formal or informal feedback on the generated training data and/or the performance of the system or the method. Thus, after each iteration of the training cycle, the corrective feedback loop may infer from the training process of the artificial intelligence system to provide modifications or alterations in the selection probabilities, if required.

The present disclosure further provides another method for training an artificial intelligence system wherein the training data is created according to the method for creating training data to classify hyperspectral data. Typically, the artificial intelligence system is configured to be trained based on the another method using the created training data from the method and upon successful training using the another method, the artificial intelligence system is configured to classify the hyperspectral data i.e. the new hyperspectral images received from different sources for classification.

In an embodiment, the method for training the artificial intelligence system comprises detecting performance of training cycle. The "training cycle" refers to the cycle comprising the steps of the method (for creating training data) performed in a conventional loop manner. Typically, the performance of the training cycle relates to the accuracy (or un-biasness) of the training data and/or the classification by the AI system. However, it will be appreciated that the performance of the training cycle may be measured using any measurement means without limiting the scope of the disclosure. Upon detecting the performance of the training cycle, the method comprises comparing the performance with a pre-set criteria. The "pre-set criteria" refers to the pre-defined standard or model performance of the training cycle, wherein the criteria is configured based on the implementational requirement. For example, the pre-set criteria is defined at 90% accuracy. Upon, comparison of the detected performance with the pre-set criteria, the method comprises providing via a feedback loop instructions to generate additional training data set if the performance is below the pre-set criteria. Typically, the "feedback loop instructions" refers to the instructions transmitted using the method for the feedback loop relating to the requirement of generating additional training data, such as in cases of unsatisfactory performance caused due to in-sufficiency of data, providing biased or inaccurate classifications.

The present disclosure also provides another artificial intelligence system wherein the another artificial intelligence system is trained according to the method for training the artificial intelligence system. Typically, the another artificial intelligence system is configured to be trained based on the method for training the artificial intelligence system and act as a remediation intelligence system employing the feedback instructions of the another method to effectively train the artificial intelligence system for classifying the hyperspectral data.

DETAILED DESCRIPTION OF THE DRAWINGS

Figure 1B:
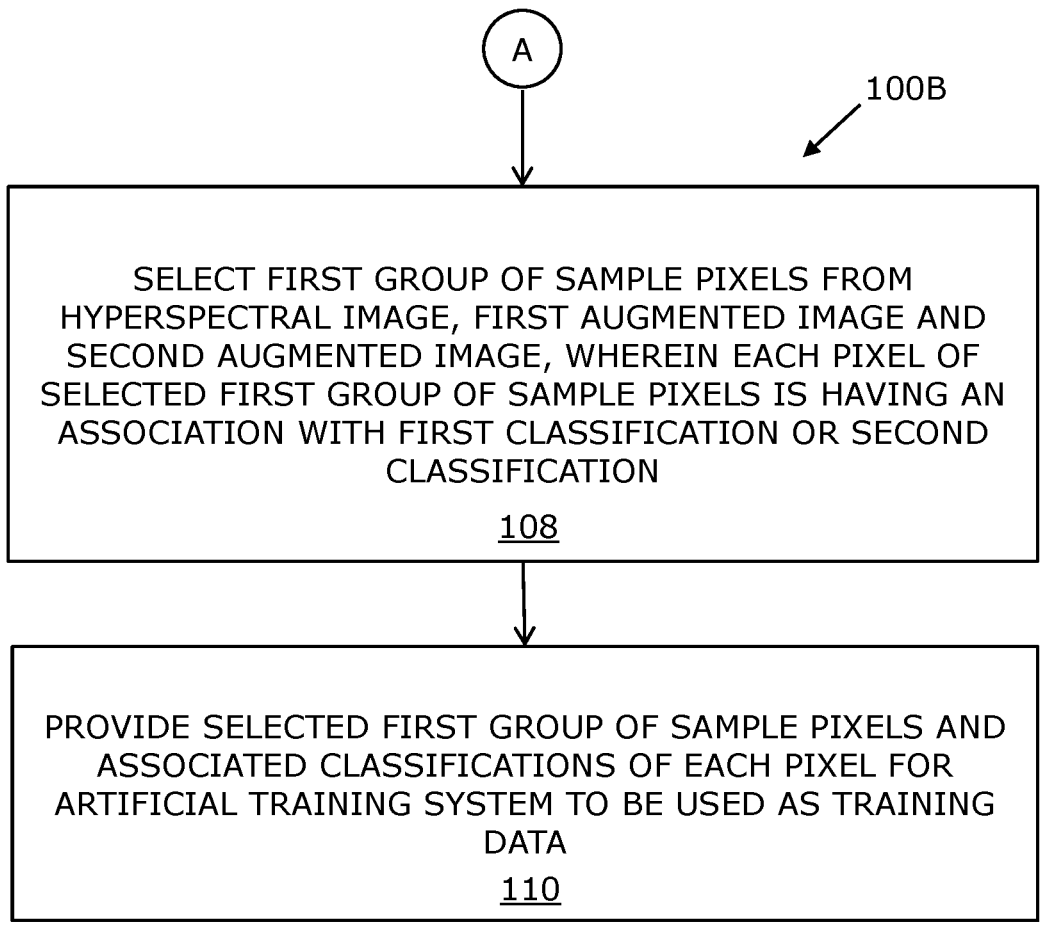

Referring to FIGS. 1A and 1B, illustrated is a flowchart of a method 100 for creating training data for an artificial intelligence system to classify hyperspectral data, the method comprising steps 102, 104, 106, 108 and 110.

At step 102, the method comprises receiving a hyperspectral image from a data source, wherein the hyperspectral image comprises a first pixel group, wherein each pixel of the first pixel group being associated with a first classification. The hyperspectral image comprising the first pixel group associated with the first classification is received from the data source.

At step 104, the method comprises forming from the hyperspectral image a first augmented image using a first augmentation algorithm, wherein the first augmented image comprises a first augmented pixel group, the first augmented pixel group being augmented from the first pixel group, each pixel of the first augmented pixel group being associated with the first classification. The hyperspectral image is augmented using the first augmentation algorithm, wherein the first pixel group associated with the first classification is augmented to the first augmented pixel group.

At step 106, the method comprises forming from the hyperspectral image a second augmented image using a second augmentation algorithm which is different from the first augmentation algorithm, wherein the second augmented image comprises a second augmented pixel group, the second augmented pixel group being augmented from the first pixel group, each pixel of the second augmented group being associated with the first classification. The hyperspectral image is augmented using the second augmentation algorithm, wherein the first pixel group associated with the first classification is augmented to the second augmented pixel group.

At step 108, the method comprises selecting a first group of sample pixels from the hyperspectral image, the first augmented image and the second augmented image, wherein each pixel of the selected first group of sample pixels is having an association with the first classification or with a second classification. The first group of sample pixels associated with a first classification is selected randomly from the hyperspectral image, the first augmented image and the second augmented image.

At step 110, the method comprises providing the selected first group of sample pixels and the associated classifications of each pixel for an artificial training system to be used as a training data. Upon selecting the first group of sample pixels, the first group of sample pixels are provided to the artificial training system to be used as a training data.

Figure 2:
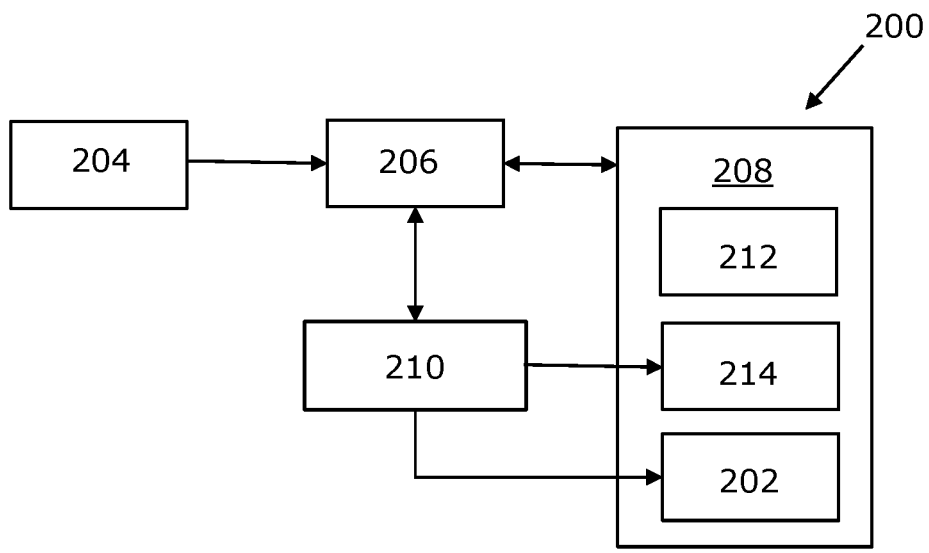
FIG. 2 is a block diagram of a system for creating training data for an artificial intelligence system to classify hyperspectral data, in accordance with an embodiment of the present disclosure.

Referring to FIG. 2, illustrated is a block diagram of a system 200 for creating training data 202 for an artificial intelligence system 204 to classify hyperspectral data, in accordance with an embodiment of the present disclosure. As shown, the system 200 comprising a communication interface 206 to receive a hyperspectral image 212. The communication interface is communicatively coupled with the artificial intelligence system 204 to classify hyperspectral data. The system 200 further comprises a data base 208 for storing the hyperspectral image 212 and one or more augmented images 214 and the created training data 202. Typically, the database 208 acts as the storage for the system 200 to create training data 202. The system 200 further comprises a processing arrangement 210 configured to execute steps of the method claims 100. Typically, the processing arrangement 210 is configured to form augmented images 214 (i.e. the first, second augmented or third augmented images) by executing the steps of the method 100 and providing the augmented images 214 or the un-augmented hyperspectral image 212 as training data 202 to the artificial intelligence system 204 via the communication network 206.

Figure 3:
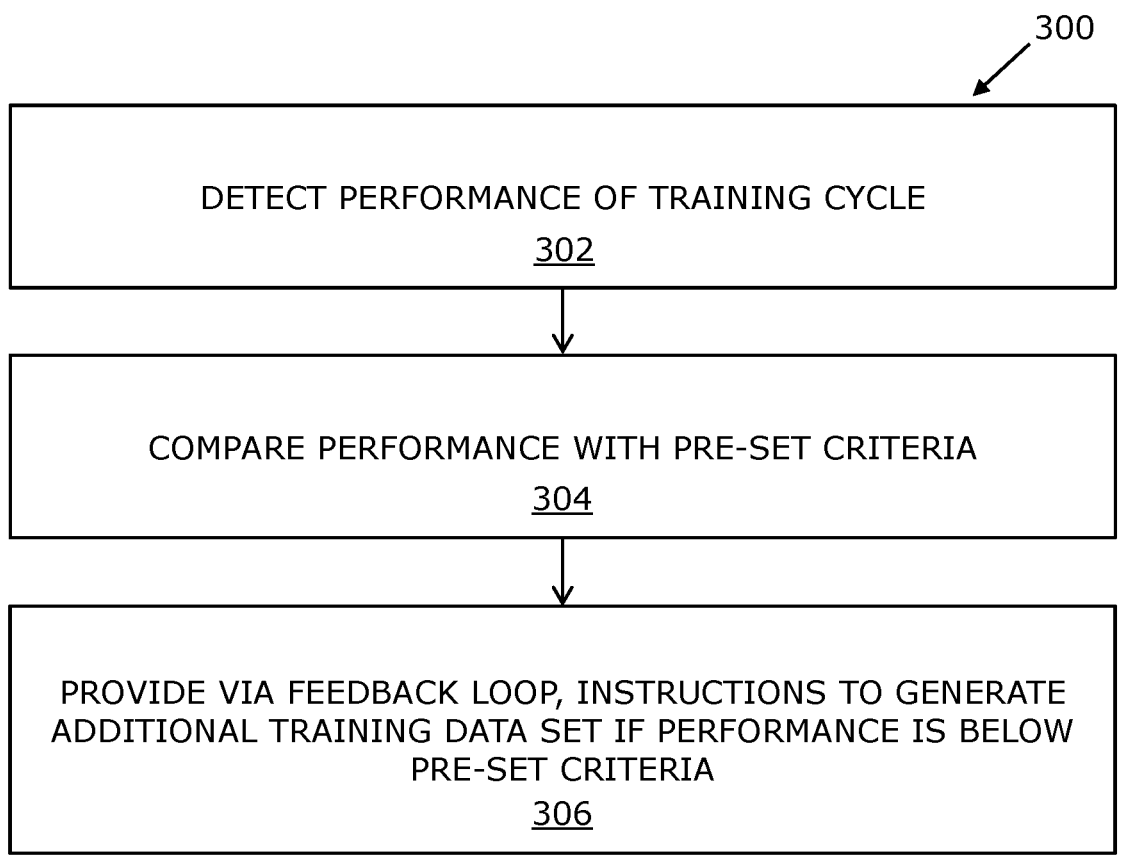
FIG. 3 is a flowchart listing steps involved in a method for training an artificial intelligence system, in accordance with embodiment of the present disclosure.

Referring to FIG. 3, illustrated is a flowchart of a method 300 for training an artificial intelligence system 204, in accordance with an embodiment of the present disclosure. Herein, the training data 202 is created using the method 100. As shown, the method 300 comprises steps 302, 304 and 306.

At a step 302, the method 300 comprises detecting performance of training cycle. The performance of the training cycle of the method 100 for creating the training data 202 is detected as a parameter for further comparison.

At a step 304, the method 300 comprises comparing the performance with pre-set criteria. The detected performance of the training cycle is compared with the pre-set criteria for evaluating need for further generation of data. Typically, if the pre-set criteria is met by the performance of the training cycle, the method 300 is terminated, or the training cycle is initiated again if the performance of the training cycle does not meet the pre-set criteria.

At a step 306, the method 300 comprises providing via a feedback loop instructions to generate additional training data set if the performance is below the pre-set criteria. The feedback loop instructions enable the method 300 to transmit information to the method 100 if a need for generating additional training data is present (i.e. the performance of the training cycle does not meet the pre-set criteria).

Figure 4:
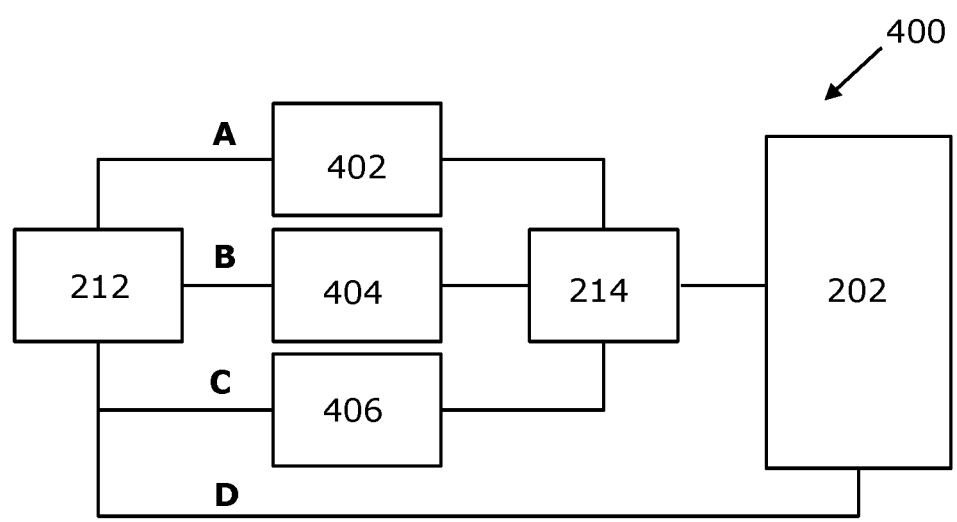
FIG. 4 is a flowchart representing the probabilistic selection of the method for creating training data for an artificial intelligence system to classify hyperspectral data, in accordance with an embodiment of the present disclosure.

Referring to FIG. 4, illustrated is a flowchart 400 representing the probabilistic selection of the method 100 for creating training data 202, in accordance with an embodiment of the present disclosure. As shown, the hyperspectral image 212 is configured to form the training data 202 by either augmenting or not augmenting the hyperspectral image 212 to form the training data 202. Typically, the hyperspectral image 212 is augmented to form the training data 202 using either a first augmentation algorithm A to form a first augmented image 402, wherein the first augmented image 402 is formed using PCA, the second augmentation algorithm B to form a second augmented image 404, wherein the second augmented image 404 is formed using multivariate noise augmentation, a third augmentation algorithm C to form a third augmented image 406, wherein the third augmented image 406 is formed using stochastic instance averaging. If the hyperspectral image 212 is not augmented using any of the augmentation algorithms A, B or C, the hyperspectral image 212 follows a path D to be transmitted un-augmented to form the training data 202. Notably, the augmentation algorithms A, B or C may be considered as pathways for the hyperspectral image 212 to form the training data 202. Thus, the augmented images 402, 404 or 406 or the un-augmented image (i.e. the hyperspectral image 212) have an equal probability of occurrence i.e. 25%. Alternatively stated, the selection probabilities of A, B, C and D are equal and any of the paths A, B, C and D have an equal probability of occurrence.

The invention claimed is:

1. A method for creating training data for an artificial intelligence system to classify hyperspectral data, the method comprising:
   receiving a hyperspectral image from a data source, wherein the hyperspectral image comprises a first pixel group, wherein each pixel of the first pixel group being associated with a first classification;
   forming from the hyperspectral image a first augmented image using a first augmentation algorithm, wherein the first augmented image comprises a first augmented pixel group, the first augmented pixel group being augmented from the first pixel group, each pixel of the first augmented pixel group being associated with the first classification;
   forming from the hyperspectral image a second augmented image using a second augmentation algorithm which is different from the first augmentation algorithm, wherein the second augmented image comprises a second augmented pixel group, the second augmented pixel group being augmented from the first pixel group, each pixel of the second augmented group being associated with the first classification;
   selecting a first group of sample pixels from the hyperspectral image, the first augmented image and the second augmented image, wherein each pixel of the selected first group of sample pixels is having an association with the first classification or with a second classification; and
   providing the selected first group of sample pixels and the associated classifications of each pixel for an artificial training system to be used as a training data.

2. The method according to claim 1, wherein the method further comprises
   forming from the hyperspectral image, a third augmented image using a third augmentation algorithm which is different from the first and the second augmentation algorithm, wherein the third augmented image comprises a third augmented pixel group, the third augmented pixel group being augmented from the first pixel group, each pixel of the third augmented group being associated with the first classification and
   selecting further comprises selecting to the first group of sample pixels, pixels from the third augmented image.

3. The method according to claim 1 wherein
   the first augmentation algorithm is principle component analysis;
   the second augmentation algorithm is multi variate noise method.

4. The method according to claim 2 wherein the third augmentation algorithm is stochastic random averaging method.

5. The method according to claim 2, wherein selecting of the first group of sample pixels comprises
   defining a sample size;
   selecting randomly amount of pixels corresponding to the sample size, from the hyperspectral image, the first augmented image, the second augmented image and the third augmented image to form the first group of pixels.

6. The method according to the claim 5, wherein the random selection is carried by (i) setting a first selection probability for the hyperspectral image, a second selection probability for the first augmented image, a third selection probability for the second augmented image and a fourth selection probability for the third augmented image for each image type;

(ii) selecting randomly image using the selection probabilities;

(iii) selecting randomly a pixel from the randomly selected image;

(iv) repeating steps (ii) and (iii) until amount of selected pixels corresponds to the sample size.

7. The method according to claim 1 wherein the first augmentation algorithm comprises:

(a) selecting a pixel to be augmented from the hyperspectral image;

(b) decomposing spectral bands to identify eigenvectors and eigenvalues, wherein the spectral bands correspond to a spectral signature of the pixel;

(c) selecting a largest eigenvalue for the pixel;

(d) augmenting the pixel by multiplying the selected largest eigenvalue by a random scaling factor; and (e) selecting a next pixel to be augmented from the hyperspectral image, wherein the next pixel is different from a previously augmented pixel and repeating steps (b), (c), (d) and (e) until all pixels of the hyperspectral image are augmented.

8. The method according to claim 1, wherein the second augmentation algorithm comprises:

(A) selecting a pixel to be augmented from the hyperspectral image;

(B) decomposing spectral bands to determine a covariance matrix, wherein the spectral bands correspond to a spectral signature of the pixel, (C) computing a multivariate normal distribution, around a mean value of each spectral band, using the covariance matrix, (D) scaling the multivariate normal distribution by multiplying with an optimisable magnitude parameter;

(E) adding the scaled multivariate normal distribution to the pixel for augmenting the pixel (F) selecting a next pixel to be augmented from the hyperspectral image, wherein the next pixel is different from previously augmented pixel and repeating steps (B), (C), (D) and (E) until all pixels of the hyperspectral image are augmented.

9. The method according to claim 2, wherein the third augmentation algorithm comprises:

(I) selecting a pixel to be augmented from the hyperspectral image;

(II) identifying one or more pixel using a Poisson distribution, wherein the one or more pixels are adjacent to the pixel;

(III) adding the identified one or more pixels, with the pixel, to form a super-pixel for augmenting the pixel (IV) selecting a next pixel to be augmented from the hyperspectral image, wherein the next pixel is different from previously augmented pixel and repeating steps (II) and (III) until all pixels of the hyperspectral image are augmented.

10. The method according to claim 1, wherein the first pixel group of the hyperspectral image is a representation of a first object the first object having association with the first classification.

11. The method according to claim 10, wherein the hyperspectral image comprises a second pixel group which is a representation of a second object, the second object having association with the second classification.

12. The method according to claim 1, wherein each pixel to be used for the training data has an associated classification.

13. A system for creating training data for an artificial intelligence system to classify hyperspectral data, the system comprising a communication interface to receive a hyperspectral image a data base for storing the hyperspectral image and one or more augmented images and created training data;

a processing arrangement configured to execute method steps of claim 1.

14. The system according to claim 13, wherein processing arrangement comprises means to perform random selection of pixels, the means selected from a group of: a random generator, a pseudorandom generator, a pre-defined sequence, a seed based random generator.

15. The system according to claim 13, wherein a selection probabilities for a hyperspectral image, a first augmented image, a second augmented image and a third augmented image are modified based on feedback loop from training process of artificial intelligence system.

16. A method for training an artificial intelligence system wherein the training data is created according to claim 1.

17. The method according to claim 16, wherein the method comprises:

detecting performance of training cycle;

comparing the performance with pre-set criteria; and providing via a feedback loop instructions to generate additional training data set if the performance is below the pre-set criteria.

18. An artificial intelligence system, wherein the artificial intelligence system is trained according to the method of claim 16.

* * * * *